Dec. 26, 1939.   P. SIEDLER ET AL   2,184,477
APPARATUS FOR CARRYING OUT THE BLEACHING OF BAST FIBERS
Original Filed Jan. 10, 1935
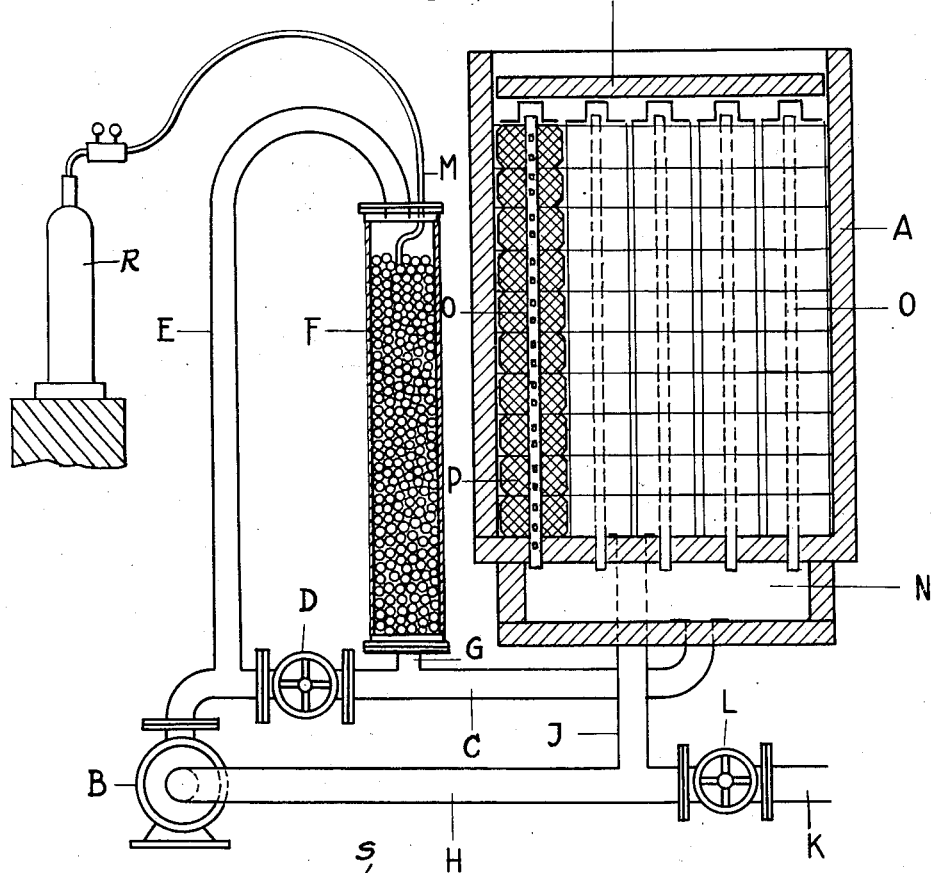
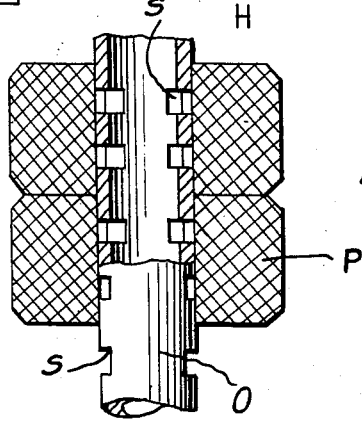
INVENTORS:
Philipp Siedler,
Erich Mayer,
Helmuth Korte,
Wilhelm Waibel
By Potter, Pierce & Scheffler,
ATTORNEYS.

Patented Dec. 26, 1939

2,184,477

UNITED STATES PATENT OFFICE 2,184,477

APPARATUS FOR CARRYING OUT THE BLEACHING OF BAST FIBERS

Philipp Siedler, Erich Kayser, Helmuth Korte, and Wilhelm Waibel, Frankfort-on-the-Main, Germany, assignors to I. G. Farbenindustrie Aktiengesellschaft, Frankfort-on-the-Main, Germany Original application January 10, 1935, Serial No. 1,248. Divided and this application October 27, 1937, Serial No. 171,352. In Germany January 20, 1934

2 Claims. (Cl. 68—189)

The present invention relates to an apparatus for carrying out the bleaching of bast fibers, particularly on cross-wound bobbins, by chlorinating the impurities with chlorine water. The particular method of bleaching bast fibers, for which this apparatus is suitable, is described and claimed in the co-pending U. S. application Serial No. 1,248 filed January 10, 1935, in the name of Philipp Siedler, Erich Kayser, Helmuth Korte and Wilhelm Waibel for "A method for the bleaching of bast fibers and an apparatus therefor."

The bleaching of bast fibers with the aid of chlorine water has hitherto not been satisfactory. The usual method was to prepare the chlorine water separately and to pour this solution into a bleaching apparatus, a proceeding which involved loss of chlorine from the solution before the chlorine could be used, and much trouble due to the presence of chlorine in the atmosphere. Furthermore, the usual chlorine water contains only a relatively low concentration of active chlorine. In bleaching bast fibers, as is known, it is primarily important to chlorinate the more or less lignified impurities which by this operation are converted into an alkali-soluble condition; for this purpose the concentration of chlorine water as previously used does not suffice; particularly when the bast fibres to be chlorinated are placed tightly packed in any of the known bleaching apparatus, because the chlorine water has only a low penetrating action.

The present invention is based upon the observation that these inconveniences and insufficiencies of the bleaching of bast fibers with chlorine water are avoided by performing the preparation of saturated or supersaturated chlorine water and the introduction of this chlorine water into the bleaching vessel in one apparatus. For this purpose an apparatus for the preparation of the chlorine water is constructed in such a manner that it may yield strongly supersaturated chlorine water, namely so that the chlorine contained in the apparatus is introduced into the water under a raised pressure; this apparatus is combined with the bleaching device so as to form a closed system. The supersaturated chlorine water is thus caused to act directly on the bast fibers and has no opportunity of losing chlorine in excess of saturation under atmospheric pressure. The chlorine water may also be caused to act on the bast fibers under raised pressure.

It is particularly advantageous to construct the whole apparatus in such a manner that the chlorine water circulates between the device in which it is produced and a vessel containing the material to be bleached, streaming through the said vessel from the bottom to the top, the chlorine water thus passing all parts of the fibrous material in an equal force. The whole apparatus may be provided with means for adjusting and maintaining the concentration desired of the chlorine water.

Within this apparatus it is possible to treat the bast fibers, be they tightly packed (hank yarn) or on cross-wound bobbins, with the supersaturated chlorine water to such an extent that the lignin substances are completely chlorinated. In the said apparatus such an uniform treatment of the fibers is attained that no stains are formed. By connecting the apparatus for the formation of supersaturated chlorine water with the bleaching apparatus loss of chlorine is avoided because the excess of chlorine is eagerly absorbed by the bodies accessible to the chlorination. Furthermore, a sufficient concentration of the chlorine dissolved in the water is maintained; this concentration facilitates the penetrating action of the chlorination.

In the accompanying drawing—

Fig. 1 is a diagrammatic view of an apparatus in accordance with the present invention, and Fig. 2 is a magnified part sectional view of one portion of Fig. 1.

The bast fibers, for instance, on cross-wound bobbins, are contained in a suitable bleaching apparatus A through which the liquor is caused to circulate by a pump B in the direction from the bottom to the top. In the high-pressure piping C of the pump there may be a throttle valve D. In front of this valve there is arranged a branch pipe E which discharges into the upper part of the apparatus F serving for the preparation of the chlorine water. This apparatus preferably consists of a column F charged with filling bodies. Into this column water is introduced through the inlet pipe E while chlorine is simultaneously introduced through the inlet pipe M. By filling up this column with water and chlorine under pressure the two phases are brought into contact with each other in a finely divided form by the action of the filling bodies, so that supersaturated chlorine water is formed. From the lower part of the column the chlorine water is discharged through the pipe G into the high-pressure piping C. The discharge pipe J of the bleaching apparatus opens into the suction pipe H of the pump. The pipe K which may be closed by the valve L serves for drawing off the liquor and for introducing fresh water. The apparatus is operated for instance as follows: It is filled with tap water while the valve L is opened and the valve D is closed. The valve L is then closed and the water is caused to circulate rapidly by means of the pump B. At the same time chlorine is introduced from a pressure bottle R through the pipe M into the column F so that chlorine water is produced, the pressure being adjusted according to demand. By partially opening the valve D it is possible to regulate to a large extent the quantity of water running through the column F and consequently the concentration of the chlorine water. Through the high-pressure piping C the chlorine water leaving the column F is forced into the header N whence it rises into the pipes O having lateral openings S. On these pipes the cross-wound bobbins P are placed. From the openings S of the pipes O the chlorine water is discharged into the cross-wound bobbins through which it flows to return by way of the pipes J and H into the pump B. If the method of bleaching has to be performed with application of pressure, it is necessary to provide the lid Q of the bleaching vessel with a tightening device and to make the vessel capable of resisting pressure.

We claim:

1. An apparatus for the chlorinating and bleaching of bast fibers, for instance linen, hemp or the like by saturated or supersaturated chlorine water which comprises a bleaching vessel which is provided with devices for placing the material to be treated on cross wound bobbins, a device for producing said chlorine water, a system of tubes and a pump in order to provide a continuous circulation of the chlorine water through the bleaching vessel and the device for producing the chlorine water and means for adjusting and maintaining the concentration desired of the chlorine water.

2. An apparatus for the chlorinating and bleaching of bast fibers, for instance linen, hemp or the like by saturated or supersaturated chlorine water which comprises a bleaching vessel which is provided with devices for placing the material to be treated on cross wound bobbins, a device for producing said chlorine water, a system of tubes and a pump in order to provide a continuous circulation of the chlorine water through the bleaching vessel and the device for producing the chlorine water in such a manner that the chlorine water circulates in the bleaching vessel from the bottom to the top and means for adjusting and maintaining the concentration desired of the chlorine water.

PHILIPP SIEDLER.
ERICH KAYSER.
HELMUTH KORTE.
WILHELM WAIBEL.